United States Patent [19]

Lamb et al.

[11] Patent Number: 5,547,243
[45] Date of Patent: Aug. 20, 1996

[54] TRUCK COVER PROTECTOR

[76] Inventors: Leon Lamb, 4772 S. Expressway, Forest Park, Ga. 30050; John A. Redd, 6331 Westbury Rd., Riverdale, Ga. 30274

[21] Appl. No.: 542,812

[22] Filed: Oct. 13, 1995

[51] Int. Cl.$^6$ ........................................ B60P 7/04
[52] U.S. Cl. ........................ 296/98; 160/401; 135/119
[58] Field of Search ............. 296/98, 100; 160/393, 160/396, 399, 401, 402, 68, 383, 290.1, 403; 114/103, 108; 135/119; 24/460, 461

[56] References Cited

U.S. PATENT DOCUMENTS

| | | | |
|---|---|---|---|
| 335,789 | 2/1888 | Wyant | 160/402 |
| 655,678 | 8/1900 | Allard | 160/401 |
| 1,099,660 | 6/1914 | Mgad | 160/401 |
| 1,244,403 | 10/1917 | Ament | 160/401 |
| 2,922,471 | 1/1960 | Nicholas | 160/401 X |
| 3,338,204 | 8/1967 | Barrett | 114/108 |
| 4,050,734 | 9/1977 | Richard | 296/100 X |
| 5,031,955 | 7/1991 | Sgarfoss | 296/98 |

FOREIGN PATENT DOCUMENTS

| | | | |
|---|---|---|---|
| 2726426 | 12/1978 | Germany | 135/119 |
| 3036479 | 9/1982 | Germany | 296/100 |
| 14059 | 10/1894 | United Kingdom | 160/401 |
| 760862 | 11/1956 | United Kingdom | 296/98 |

Primary Examiner—Dennis H. Pedder
Attorney, Agent, or Firm—James B. Middleton

[57] ABSTRACT

A truck cover protector encases the movable end of a truck cover to prevent damage to the truck cover while the cover is in position over the truck body. The spindle carrying the rear end of the cover is encased in a plastic cover. When the reel for the cover is at the front of the truck, the cover protector is fixed to the cover material. When the reel for the cover is on the movable spindle, the cover protector is large enough to receive the reel therein; and, end members are fixed to the protector and allow the spindle to rotate for reeling and unreeling the cover.

3 Claims, 1 Drawing Sheet

TRUCK COVER PROTECTOR

BACKGROUND OF THE INVENTION

1. Field of the Invention

This invention relates generally to truck covers, and is more particularly concerned with a protector for the end of a tarpaulin covering a truck.

2. Discussion of the Prior Art

It is common for an open truck, such as a dump truck or the like, to have a retractable tarpaulin. The tarpaulin, or cover, can be wound on a reel and the truck uncovered for loading or unloading; and, the cover can be extended over the entire body of the truck during transport to prevent the material in the truck from blowing or spilling from the truck. Generally speaking, there are two arrangements for truck covers: one arrangement has a reel fixed at the front of the truck body, and an end of the cover is fixed to a spindle that is moved rearwardly by a pair of arms; another arrangement has one end of the cover fixed at the front of the truck, and a reel is carried by a pair of arms to extend the cover over the truck, unreeling the cover from the reel.

In both of the above described arrangements, one end of the cover is carried by arms, and that end lies against the upper rear edge of the truck body. While the truck is moving, the cover is bounced against the edge of the truck, thereby severely damaging the cover. In either case, it will be understood, there is a metal core or spindle carrying the cover, and a metal edge of the truck. Bouncing of the metal spindle therefore beats the flexible cover between two metal surfaces. The result is that the covers have a very short useful life. For example, one truck in normal, regular use may require five or six new covers in one year.

SUMMARY OF THE INVENTION

The present invention provides a protector for the end of a truck cover for protecting the tarpaulin or cover from being beaten by the spindle holding the cover against the body of the truck. The protector comprises an encasement of a generally rigid material covering the flexible truck cover. If the movable member has one end of the cover attached thereto, the encasement surrounds the cover and the metal spindle, and is attached to the cover. If the movable member includes a reel holding the truck cover, the encasement is supported from the metal spindle, surrounds the reel, and allows the cover to be un-reeled from the reel through a slot in the encasement. For both arrangements, therefore, the encasement protects the truck cover from the beating it would ordinarily receive.

BRIEF DESCRIPTION OF THE DRAWINGS

These and other features and advantages of the present invention will become apparent from consideration of the following specification when taken in conjunction with the accompanying drawings in which.

DETAILED DESCRIPTION OF THE EMBODIMENTS

Figures 1, 2:
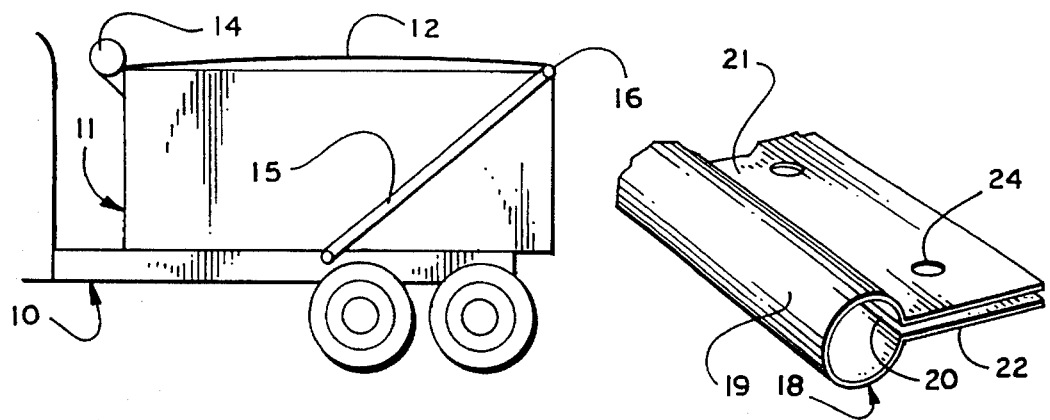
FIG. 1 is a partial side elevational view of a truck having a cover thereover, and including the protector of the present invention.
FIG. 2 is a perspective view showing a protector made in accordance with the present invention for use on the truck as shown in FIG. 1, the protector being partially broken away.

Referring now more particularly to the drawings, and to those embodiments of the invention here presented by way of illustration, FIG. 1 shows a truck 10 having a truck body, or box, 11. A tarpaulin, or cover 12 is shown extending across the top of the body 11. As shown in FIG. 1, the cover 11 is retractable on a reel 14 which is fixed to the front end of the body 11; and, the free end of the cover 11 is fixed to a spindle that extends between arms 15. Those skilled in the art will understand that, to uncover the truck body 11, the arms 15 are pivoted forward, allowing the cover 12 to wind on the reel 14. To cover the body 11, then, the arms 15 are pivoted rearwardly, pulling the cover 12 from the reel 14 and extending it over the body 11.

In the conventional arrangement, it will be recognized that the material of the cover 11 is simply wrapped around the spindle that extends between the arms 15; therefore, with the cover in the position shown in FIG. 1, the arms 15 will bounce, and the metal spindle will beat the cover against the rear edge 16 of the body 11. This beating destroys the material of the cover 11.

A protector made in accordance with the present invention is shown in FIG. 2 of the drawings. The protector is generally designated at 18 and includes a cylindrical portion 19. There is a discontinuity in the cylinder at 20, and flanges 21 and 22 extend outwardly therefrom. It will be noticed that there is a plurality of holes 24 that extend perpendicularly through both flanges 21 and 22.

While the portion 19 is here shown and described as cylindrical it will be readily noticed that other shapes can be used. A polygon of any number of sides will work, so long as the opening through the portion 19 is sufficient to receive the spindle with the cover material. Thus, the term "cylindrical" is used for convenience, and is intended to include other shapes that meet the stated criteria.

Only one end of the protector 18 is shown in FIG. 2, but those skilled in the art will understand that the structure will be the same, no matter what the length. The length will be determined based on the width of the truck with which the protector is to be used. It has been found, however, that one can currently make the protector 18 about seven feet, or about 215 cm. long and it will fit most trucks.

It is contemplated that the protector 18 will be made of a polymeric material, such as a polyolefin, a polyvinylchoride, polycarbonate, nylon or the like. The shape can be extruded and cut to length. The holes 24 can them be stamped, drilled or the like.

Figure 4:
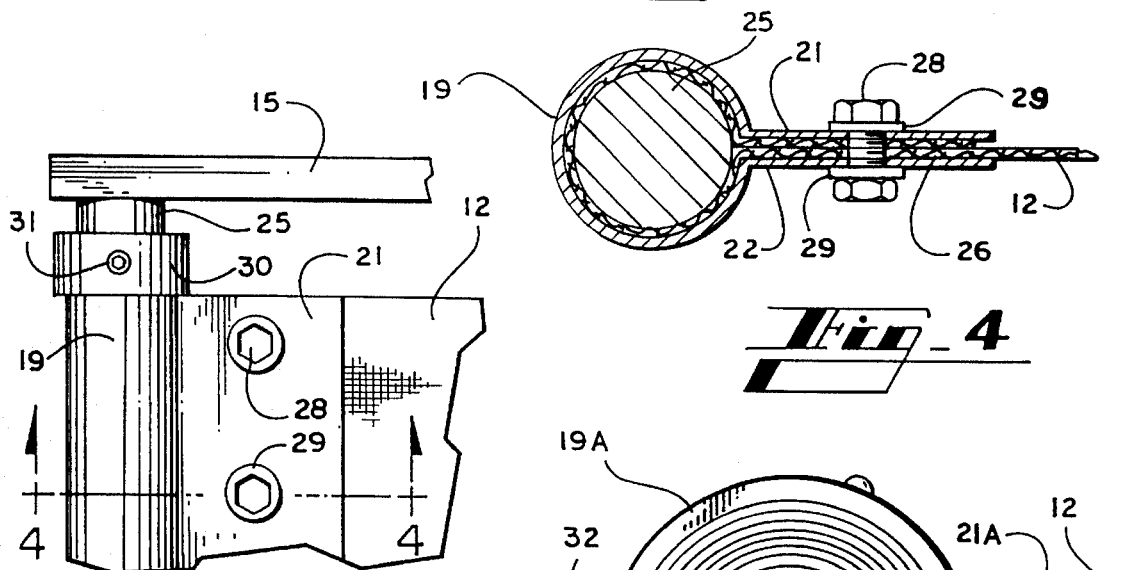
FIG. 4 is a somewhat enlarged, cross-sectional view taken substantially along the line 4—4 in FIG. 3; and, FIG. 5 is an end elevational view of a modified form of the invention, portions being broken away to shown the construction.
Figures 3, 5:
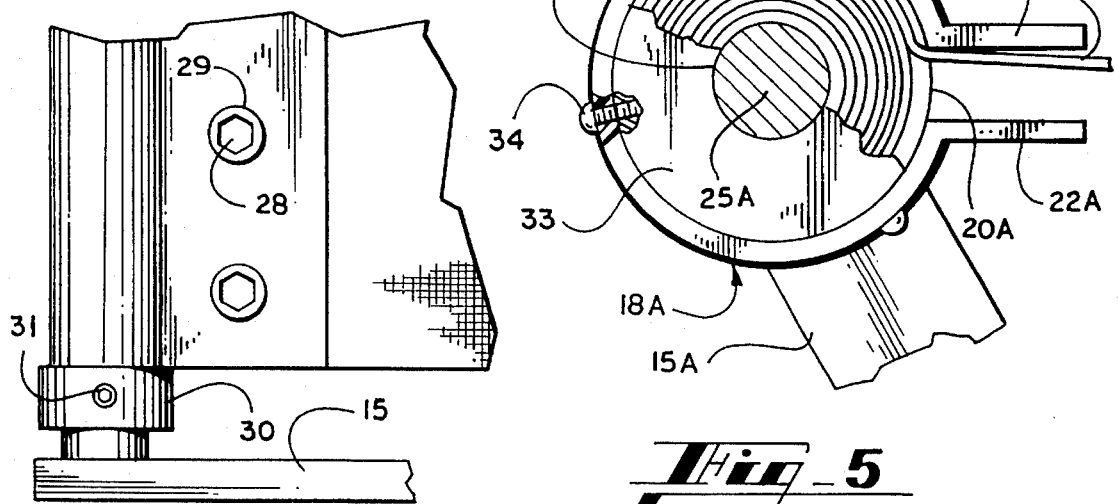
FIG. 3 is an enlarged plan view, partially broken away, showing the protector of FIG. 2 fixed to a truck cover.

With attention directed to FIGS. 3 and 4, it should now be understood that the protector 18 is to be received over the spindle that supports the cover 12. Thus, the spindle 25 extends through the opening in the cylindrical member 19, and the flanges 21 and 22 are positioned on each side of the cover 12. As is best shown in FIG. 4, the material of the cover 12 passes around the spindle 25 and overlaps the incoming material, yielding a double thickness at 26. A plurality of screws 28 is then passed through the holes 24 in the flanges 21 and 22, and through the material of the cover 12. Preferably, a washer 29 of rubber or the like is placed over each flange to protect the plastic surface, and to act as a lock washer.

Thus, with the protector 18 in place over the spindle 25, the spindle with the cover therearound is encased in the plastic material, and it is the encasement, or the protector 18, that will absorb the beating of the spindle against the truck body.

If the spindle 25 extends beyond the cover 12, it may be desirable to hold the protector properly centered on the truck body. This will assure that the cover is held straight, for minimum stress on the material of the cover 12. To hold the desired alignment, one may use a pair of collars, such as the collars 30 shown in FIG. 3. The collars 30 define holes therein to receive the spindle 25 therethrough. When the collars 30 are properly placed, a set screw 31 is tightened to hold the collars 30 in place on the spindle 25.

A modified form of the invention is shown in FIG. 5 of the drawings. The device of FIG. 5 is designed to encase the reel for the cover 12 on trucks wherein the reel is mounted on the movable arms.

The protector in FIG. 5 is generally designated at 18A, and includes a generally cylindrical member 19A having a discontinuity 20A, and flanges 21A and 22A extending outwardly therefrom. It will be noticed that the discontinuity, or slot, 20A is relatively large, while the flanges 21A and 22A are relatively short. It must be understood that, in this embodiment of the invention, the spindle 25A will include a spring means as is conventional; and, as the arms 15A move the spindle 25A, the cover 12 is either wound onto the spindle, or unwound therefrom. The protector 18A, therefore, must simply encase the reel, and float with respect to the spindle 25A and the cover 12.

It will be noticed that the reel of cover material is smaller than the inside of the cylindrical portion 19A, to rotate freely therein. The portion 19A is supported by a pair of end members 33 defining holes 32 centrally thereof. The end member 33 then fits snugly into the end of the cylindrical portion 19A of the protector 18A, and the spindle 25A is rotatably received through the hole 32. While not here shown, it will be understood that the arrangement shown is duplicated on the opposite end of the protector 18A.

To hold the end members 33 in place, there is a plurality of screws 34 that pass through appropriate holes in the cylindrical portion 19A, and threadedly engage the end member 33.

With the construction described, it will be readily understood that, when the cover 12 extends over the truck body, such as the body 11, the material of the cover 12 will be within the protector 18A, and it is the protector 18A that is beat against the truck body. The material of the cover 12 is therefore protected from damage.

When using the protector of the present invention, it should be recognized that one can take a previously damaged cover, cut off the damaged end, and wrap an undamaged section around the spindle 25. The protector 18 can then be put into place, and the cover will be usable. Thus, one might salvage numerous damaged covers that are otherwise destined to be discarded. Also, the conventional cover is longer than one normally uses, so there may be sufficient length of material even after cutting off a large, damaged end of the cover material.

It will of course by understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

We claim:

1. In a truck having a body with an open top, a front of said body and a rear of said body, a flexible cover having a width and first end fixed at said front of said body, a spindle receiving a second end of said cover, means for selectively moving said spindle to said front of said body for placing said second end of said cover adjacent to said first end for uncovering said body, and to said rear of said body for placing said second end on said rear of said body for covering said body, the combination therewith of a cover protector comprising a substantially form-rigid polymeric cylindrical portion having a length substantially equal to said width for receiving said spindle therein, said cylindrical portion defining a slot therein for receiving said cover therethrough, and rigid flanges extending from said cylindrical portion adjacent to said slot for fixing said protector to said flexible cover, so that said protector encases said spindle and said second end of said cover for protecting said cover from damage.

2. The combination as claimed in claim 1, said flanges defining a plurality of holes therethrough, and a plurality of fastening means extending through said holes and said cover for fixing said protector with respect to said cover.

3. The combination as claimed in claim 2, and further including a pair of collars selectively fixable to said spindle adjacent to said protector for preventing motion of said protector along said spindle.

* * * * *